United States Patent
Wang et al.

(10) Patent No.: US 7,266,496 B2
(45) Date of Patent: Sep. 4, 2007

(54) SPEECH RECOGNITION SYSTEM

(75) Inventors: Jhing-Fa Wang, Tainan (TW);
Jia-Ching Wang, Tainan (TW);
Tai-Lung Chen, Tainan (TW);
Chin-Chan Chang, Tainan (TW)

(73) Assignee: National Cheng-Kung University, Tainan (TW)

( * ) Notice: Subject to any disclaimer, the term of this patent is extended or adjusted under 35 U.S.C. 154(b) by 850 days.

(21) Appl. No.: 10/328,482

(22) Filed: Dec. 24, 2002

(65) Prior Publication Data

US 2003/0125938 A1    Jul. 3, 2003

(30) Foreign Application Priority Data

Dec. 25, 2001    (TW) .............................. 90132450 A

(51) Int. Cl.
*G10L 15/08*    (2006.01)
(52) U.S. Cl. ................ 704/241; 704/201; 704/219; 704/231; 704/221; 704/217
(58) Field of Classification Search ............... 704/201, 704/231, 251, 246, 241, 217, 216, 219, 221
See application file for complete search history.

(56) References Cited

U.S. PATENT DOCUMENTS

| | | | | |
|---|---|---|---|---|
| 5,495,553 A | * | 2/1996 | Jakatdar | 704/251 |
| 5,664,058 A | * | 9/1997 | Vysotsky | 704/243 |
| 5,778,342 A | * | 7/1998 | Erell et al. | 704/256.8 |
| 6,253,175 B1 | * | 6/2001 | Basu et al. | 704/231 |
| 6,304,844 B1 | * | 10/2001 | Pan et al. | 704/257 |
| 6,671,669 B1 | * | 12/2003 | Garudadri et al. | 704/255 |
| 6,735,563 B1 | * | 5/2004 | Bi | 704/241 |

* cited by examiner

*Primary Examiner*—Vijay B. Chawan

(57) ABSTRACT

The present invention discloses a complete speech recognition system having a training button and a recognition button, and the whole system uses the application specific integrated circuit (ASIC) architecture for the design, and also uses the modular design to divide the speech processing into 4 modules: system control module, autocorrelation and linear predictive coefficient module, cepstrum module, and DTW recognition module. Each module forms an intellectual product (IP) component by itself. Each IP component can work with various products and application requirements for the design reuse to greatly shorten the time to market.

10 Claims, 9 Drawing Sheets

| Timing | 0 | 1 | 2 | 3 | 4 | 5 | 6 | 7 | 8 | 9 | 10 | 11 | 12 | 13 | 14 | 15 | 16 | 17 | 18 | 19 | 20 | ..... | 119 | 120 | ..... | 134 | 135 |
|---|---|---|---|---|---|---|---|---|---|---|---|---|---|---|---|---|---|---|---|---|---|---|---|---|---|---|---|
| Left |  | 2 |  | 3 | 3 |  |  | 4 | 4 | 4 |  | 5 | 5 | 5 | 5 |  | 6 | 6 | 6 | 6 | 6 | ..... |  | 16 | ..... | 16 | 16 |
| Lower Left |  |  |  | 4 |  |  | 6 | 6 | 6 |  |  | 8 | 8 | 8 |  |  | 10 | 10 | 10 | 10 |  | ..... |  | 30 | ..... | 30 |  |
| Downward | 1 |  | 2 | 2 |  | 3 | 3 | 3 | 3 |  | 4 | 4 | 4 | 4 |  | 5 | 5 | 5 | 5 | 5 |  | ..... | 15 | 15 | ..... | 15 |  |

Table 1

SPEECH RECOGNITION SYSTEM

BACKGROUND OF THE INVENTION

1. Field of the Invention

The present invention relates to a speech recognition system, more particularly to a speech recognition system designed by the application specific integrated circuit (ASIC) architecture and divided into 4 modules by the modular design.

2. Description of the Related Art

As the portable system prevails and the application of voice for man-machine interface becomes more important day after day, the implementation of the algorithm of speech processing onto the hardware demands immediate attention. The speech processing used by such portable system generally adopts a single chip processor or digital signal processor to accomplish the purpose. The cost of single chip processor is low, but the computing function is not as powerful and difficult to carry out the more complicated speech computation. If digital signal processor is used for developing the system, it takes shorter time and has more flexibility in design, but the cost is higher. The present invention uses ASIC architecture to fully implement the whole speech recognition process (from inputting the voice to outputting the recognition result); the speed of execution is faster than that of the digital signal processor, and the cost for such implementation on a portable system is lower than that on a digital signal processor.

SUMMARY OF THE INVENTION

The primary objective of the present invention is to use an application specific integrated circuit (ASIC) architecture to design the speech recognition system in order to expedite its execution speed and lower the cost of implementing such system onto the portable system.

The secondary objective of the present invention is to use the modular design to divide the speech recognition system into 4 modules; each module forms an intellectual product (IP) component by itself, and each IP component can work with various products and application requirements for the design reuse, and thus greatly shorten the time to market.

To accomplish the abovementioned objectives, the present invention provides a speech recognition designed by using the ASIC architecture to input the speech and output the recognition result. In the meantime, the modular design divides the system into 4 modules, and such 4 modules can form an intellectual product each by themselves. The 4 modules include:

a control module, for receiving an external signal to control the internal circuit, and such external signal further includes two types: training button 60 and recognition button 70;

an autocorrelation and linear predictive coefficient (LPC) module, comprising an autocorrelation parameter unit and a linear predictive parameter unit, and such two units can separately find the autocorrelation parameter and the linear predictive parameter to convert an input speech data into an output linear predictive parameter;

a cepstrum module for receiving the linear predictive coefficient and outputting the cepstrum coefficient as the audio data module;

a dynamic timing warping (DTW) module, using a DTW algorithm to compare the video data model to output the recognition score;

additionally, it also comprises a speech receiving module, composed of a set of shift registers and a set of general registers acting as the external sampling frequency and the internal operating frequency interfaces to convert the received speech data frequency until it is consistent with the operating frequency of the internal circuit first, and then read the computation result;

additionally, it also comprises an external memory (RAM) for storing the cepstrum of the training speech data; wherein the training button passes through the autocorrelation and linear predictive coefficient module and the cepstrum module after the system receives the training speech data, and then save the cepstrum of the training speech data into the RAM;

the recognition model passes through the autocorrelation and linear predictive coefficient module and the cepstrum module after the system receives the recognition speech data, and then save the cepstrum of the recognition speech data into the internal register and then informs the recognition button to start accessing the cepstrum of the training speech data previously saved in the RAM and the cepstrum of the recognition speech data of the internal register for performing the recognition and further outputting the recognition score. After each record of training speech data obtains the recognition score, the control module will take over to select the best score to output the recognition result.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

Figure 11:
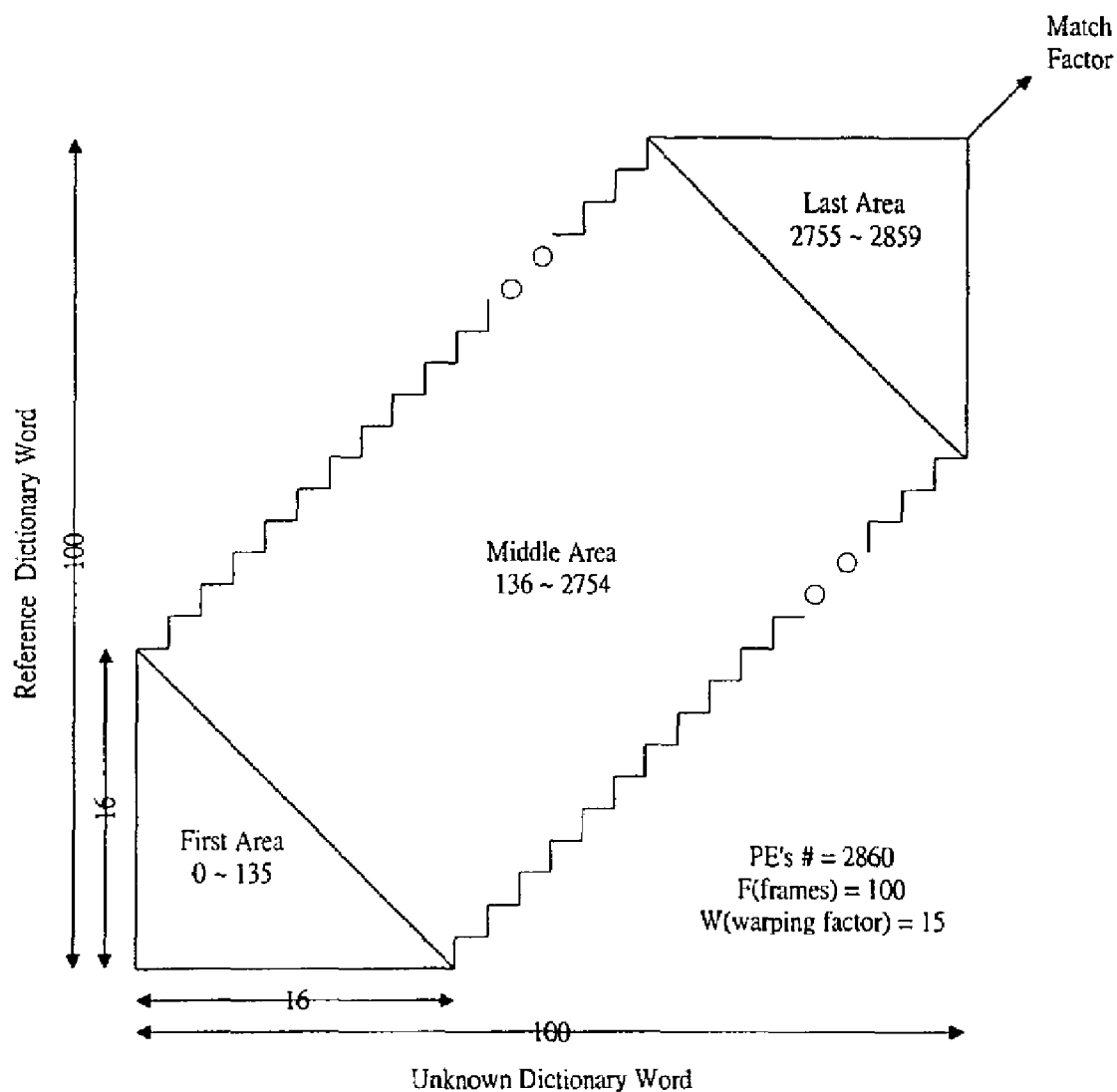
FIG. 11 is an illustrative diagram of the lattice of the dynamic timing warping of the present invention after dividing the score.

Table 1 shows the timing control of the front section of FIG. 11.

DETAILED DESCRIPTION OF THE PREFERRED EMBODIMENTS

Figure 1:
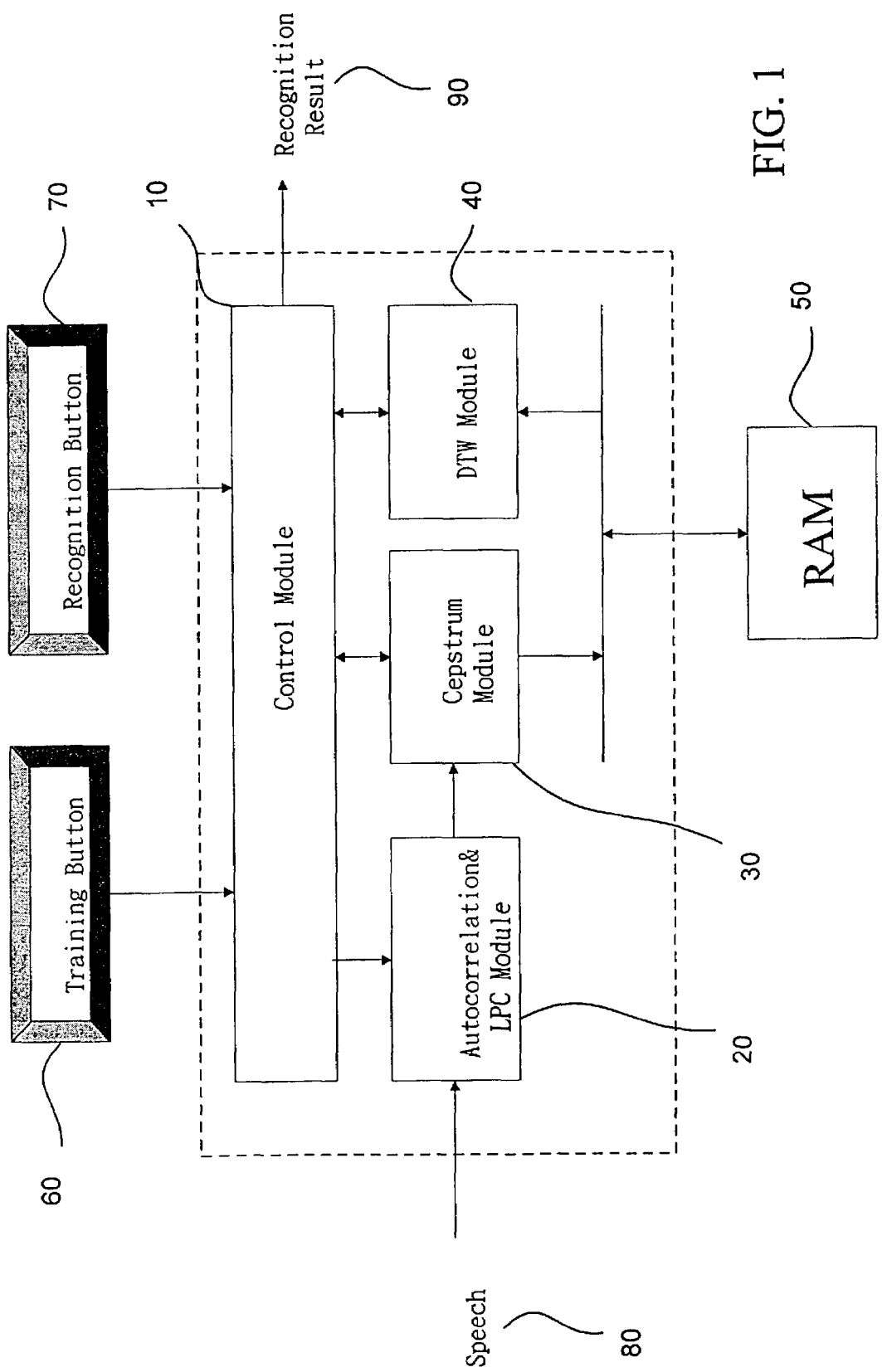
FIG. 1 is a block diagram of the structure of the present invention.

To disclose the present invention, preferred embodiments accompanied with diagrams are described as follows. The speech recognition system of the present invention, starting from inputting the speech data into the microphone, requires the following processes: Low Pass Filter 1, a Pre-emphasis 2, Windowing 3, Autocorrelation Analysis 4, Endpoint Detection 5, Linear Predictive Coefficient Analysis (LPC Analysis) 6, Cepstrum Extraction 7, Reference Updating 8, Dynamic Timing Warping (DTW) 9, and Decision Logic 10. At last, the recognition result is displayed (from the 7-sectional display or LED display). The whole speech recognition system is implemented by the application specific integrated circuit (ASIC) architecture. FIG. 1. is the illustrative diagram of the structure of the present invention, wherein the input is Speech 80, and the output is the Recognition Result 90. In the meantime, the modular design divides the speech recognition system of the present invention into 4 modules for its design. Each of the four modules can form an intellectual product (IP) component on its own, and each IP component can work with various products and application requirements for the design reuse to greatly shorten the time to market. The 4 modules include: a Control Module 10 for receiving external signals and controlling the internal circuit, and the external signals include two types: a Training Button 60 and a Recognition Button 70; an Autocorrelation & LPC Module 20 is composed of autocorrelation coefficient unit and linear predictive coefficient unit, and such two units can separately find the autocorrelation coefficient and linear predictive coefficient by converting the speech data into the linear predictive parameter; a Cepstrum Module 30 for receiving the foregoing linear predictive coefficient and outputting the cepstrum as the speech data model; a Dynamic Timing Warping (DTW) algorithm; a DTW Module 40, adopting a Dynamic Timing Warping (DTW) algorithm, such that the recognition score is outputted after the foregoing speech module is compared. Additionally, the speech recognition also includes a speech receiving module which is composed by a set of shift registers and a set of regular registers, acting as the interfaces of the external sampling frequency and internal operating frequency to convert the received speech data frequency until the operating frequency of the internal circuit is consistent, and then reading out the computation result; an external memory (RAM) 50 for storing the cepstrum of the speech data. In which, the low pass filter is disposed outside the chip, which is implemented by separate components. The division of operation of the other four modules is described below: The control module 10 processes the reference updating 8 and the decision logic 10; the autocorrelation and linear predictive coefficient modules 20 processes the pre-emphasis 2, windowing 3, autocorrelation analysis 4, endpoint detection 5, and LPC analysis 6. The cepstrum module 30 processes cepstrum extraction 7. The DTW recognition module 40 processes the dynamic timing warping (DTW) 9.

The control module 10 is connected to the autocorrelation and linear predictive coefficient module 20 unidirectionally, that is, signals only flow from the control module 10; and the control module 10 is connected to the capstrum module 30 and DTW module 40 bidirectionally. The autocorrelation and linear predictive coefficient module is connected to the cepstrum module 30 unidirectionally, that is, signals are transferred from the autocorrelation and linear predictive coefficient module to the cepstrum module 30.

When the speech recognition system of the present invention receives different control signals, the system will have different processing modules according to the different control signals. There are two modules as described below: (1) training button for receiving different training speech data and saving the cepstrum of the training speech data into the external memory RAM 50 after passing through the autocorrelation and linear predictive coefficient module 20 and the cepstrum module 30, and (2) recognition module for receiving the recognition speech data and saving the cepstrum of the recognition speech data in the internal register after passing through the autocorrelation and LPC module 20 and the cepstrum module 30, and informing the DTW recognition module 40 to start accessing the cepstrum of the training speech data previously stored in the external memory RAM 50 and the cepstrum of the recognition speech data of the internal register for recognition and outputting the recognition score. After every record of the training speech data obtains the recognition score, the control module 10 will take over and select the best score to output the recognition score. 90.

Figure 2:
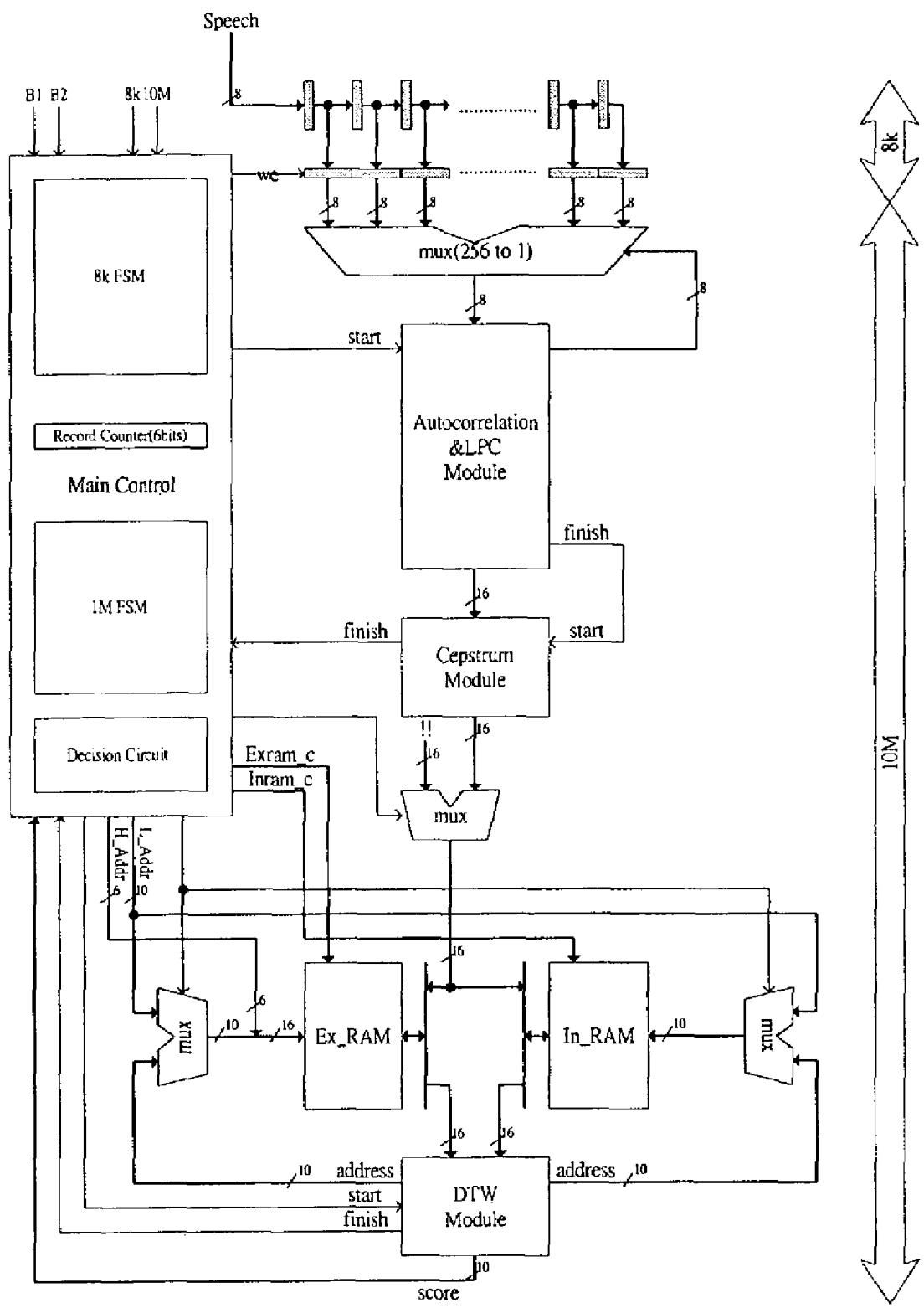
FIG. 2 is a detailed block diagram of the structure of the present invention.
Figure 3:
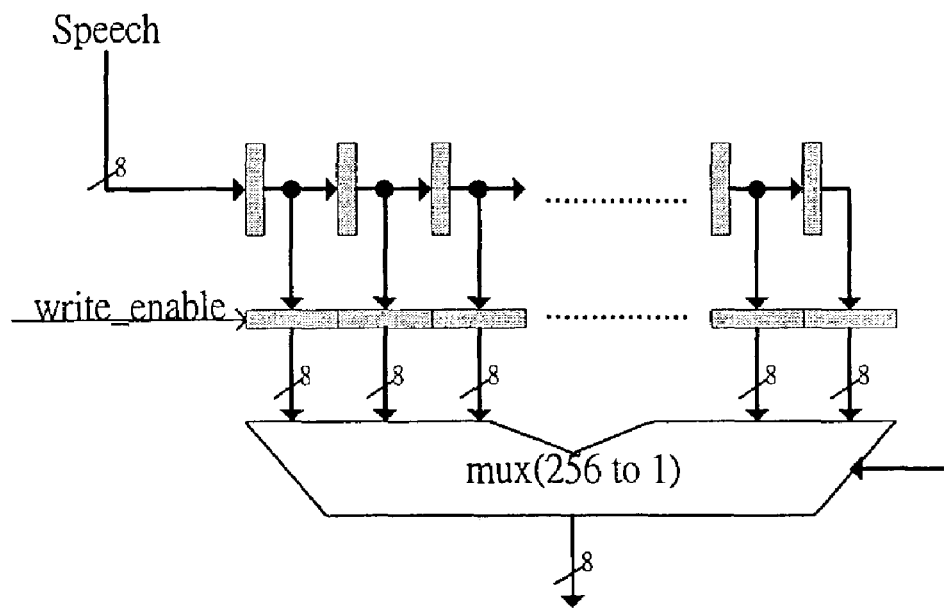
FIG. 3 is a diagram of the structure of the circuit of the speech receiving module of the present invention.

The detailed structure of the present invention as shown in FIG. 2 will be described as follows:

Speech Receiving Module: the whole system includes two frequencies; one is the external sampling frequency, and the other is the internal operating frequency. Since the frequencies of the two are different, we have designed a speech receiving module to act as the interface for these two different frequencies. For example, if the external sampling frequency is 8 KHz and the operating frequency of the internal circuit is 10 MHz, then the frequency 8 KHz is used to receive speech data, while the frequency 10 MHz is used to read out the computation result. The circuit structure of the speech receiving module is shown in FIG. 3.

Figure 4:
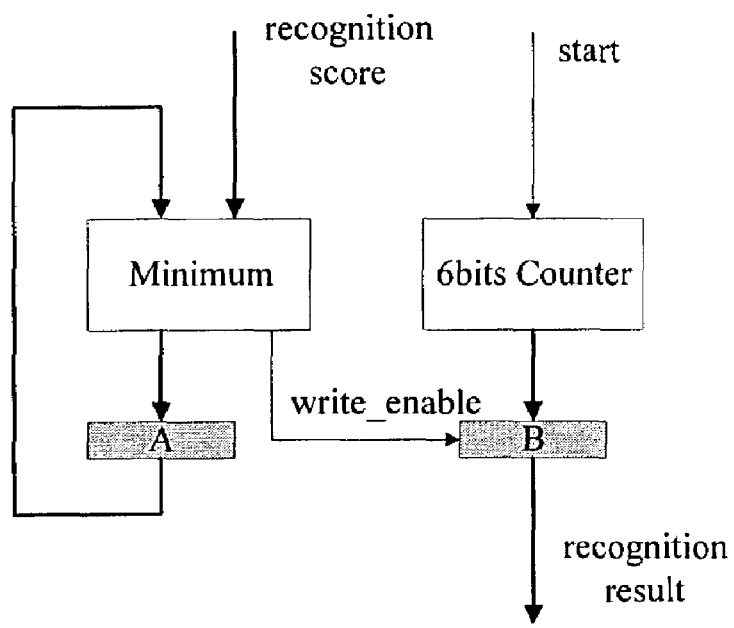
FIG. 4 is a circuit diagram of the structure of decision logic of the present invention.

Control Module: The control module 10 is divided into two main parts; one is the finite status machine (FSM) of the external accessing frequency (for example 8 KHz) and the other one is the internal operating frequency (for example 10 MHz). These two parts are separately controlled by the external signals to control the internal circuit. The finite status machine of the external sampling frequency mainly controls the speech receiving module. After the collection of speech data is completed, the autocorrelation and LPC module 20 is noticed to start reading the speech data for computation. The finite status machine of the internal operating frequency mainly controls the external memory RAM 50 and the access of the internal register, and coordinates the communication between modules. When the cepstrum module 30 completes issuing the signal, the control memory or register will write the speech parameter according to different operating module. For training button, the speech parameter is written into the external memory RAM 50. For recognition button, after the speech parameter is written into the internal register, the DTW recognition module 40 is noticed to perform the comparison. When the DTW recognition module 40 outputs every record of recognition score, and then notices the decision logic to perform the computation, and finally outputs the recognition result 90. The decision logic will output the every recognition score outputted from the DTW recognition module 40 for determining the best score. FIG. 4 shows circuit of the decision logic, and the decision logic is mainly composed of the minimum selection circuit and a counter. When the start signal is initialized, and then the recognition score is inputted. The present smallest recognition score is used as the minimum selection. If the outputted recognition score is smaller than the present smallest recognition score, then write the inputted recognition score into Register A, and the reading of the counter into Register B, and such counter is controlled by the start signal. After all recognition scores are inputted, then the value in Register B is the recognition result.

Figure 5:
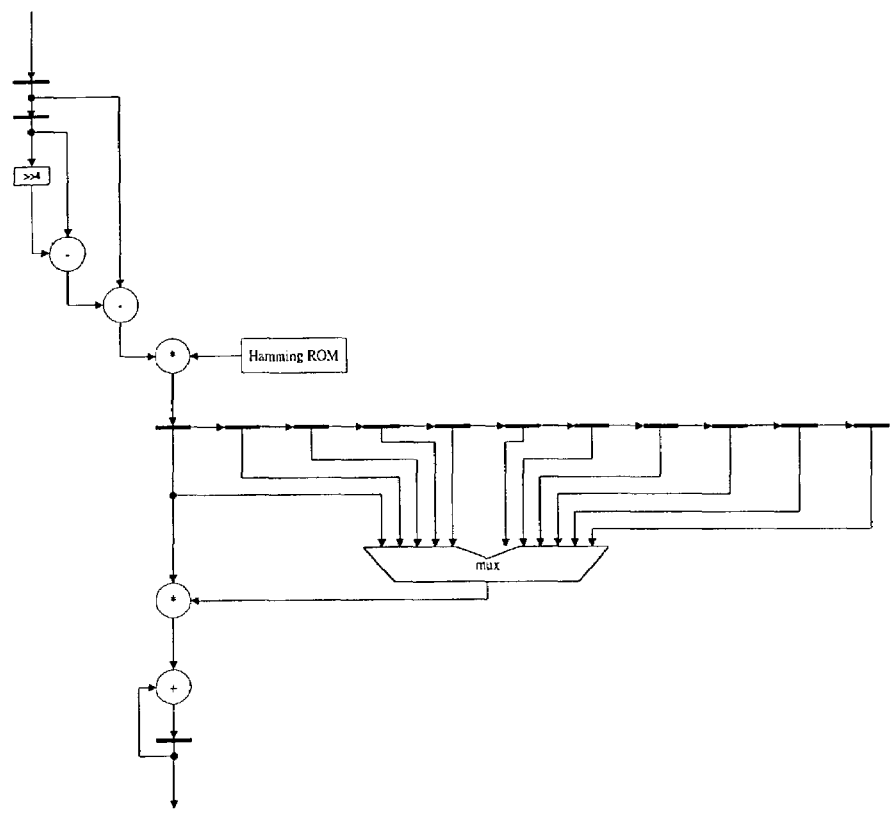
FIG. 5 is a circuit diagram of the structure of the linear predictive coefficient unit of the present invention.

Autocorrelation and LPC Module: The autocorrelation and LPC module 20 is divided into 2 main units: autocorrelation unit and the linear predictive coefficient unit for respectively find the autocorrelation coefficient and the linear predictive coefficient. The autocorrelation unit receives 256 records of speech data, and output 11 scale-ten parameters. The autocorrelation unit is divided into 3 main sections: pre-emphasis section, Hamming window section, and autocorrelation section. After understanding the concepts of these three sections, the present invention designs the circuit with the autocorrelation unit as shown in FIG. 5. In the figure, two multipliers are used; the multiplier at the top is used to multiply the speech data with the Hamming window, and the value of the Hamming window will be saved in the Hamming ROM. The multiplier below is combined with an adder to form a set of multiplication accumulation circuit to find the 11 scale-ten autocorrelation coefficients in sequence.

Figure 6:
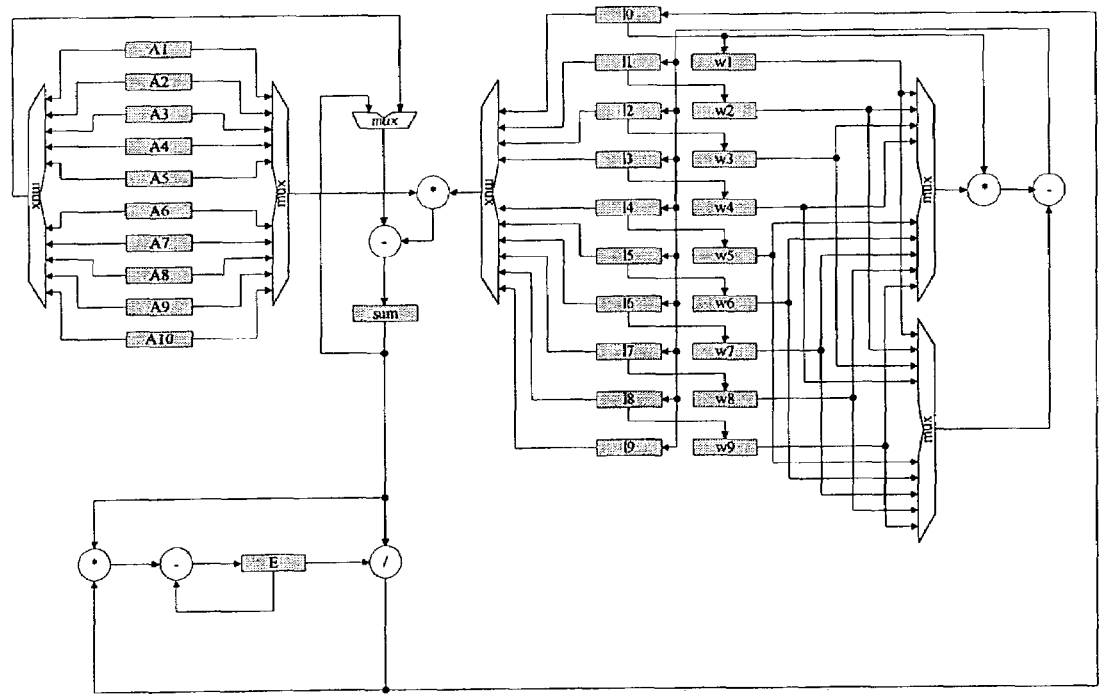
FIG. 6 is a circuit diagram of the structure of the linear predictive unit of the present invention.

The linear predictive unit is used to find the linear predictive coefficient, and its computation includes three main sections: accumulation, division, and reference updating, and the structure of its circuit is shown in FIG. 6. The Registers A1 to A10 on the left are used to individually store the autocorrelation coefficients, and the 19 shift registers on the right are used to save the linear predictive coefficients. The Register Sum below is used for accumulation, and the Register E is used to store the estimated errors.

Figure 7:
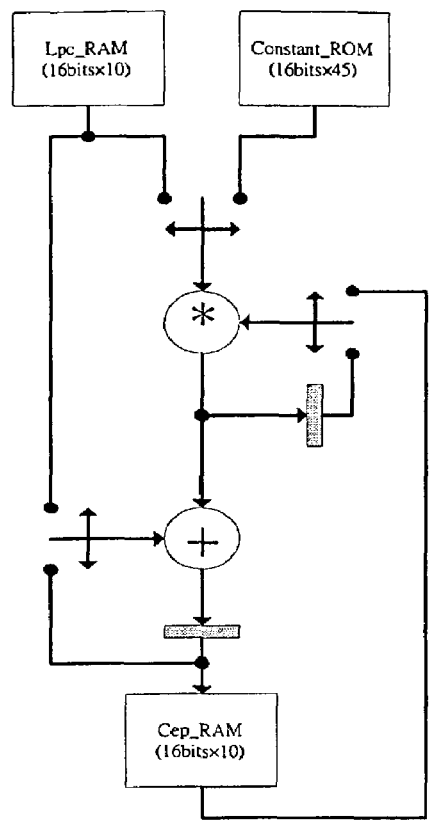
FIG. 7 is a circuit diagram of the structure of the cepstrum module of the present invention.

Cepstrum Module: The cepstrum module 30 receives the linear predictive coefficient and output the cepstrum parameter. Furthermore, under the consideration of area, its circuit shown in FIG. 7 only uses a set of multiplier and adder, a set of ten 16-bit LPC RAMs to save the linear predictive coefficients, a 16-bit constant ROM to save 45 constants. Ten 16-bit Cep RAMs are used to store the cepstrum parameters.

DTW Recognition Module: The DTW recognition module 40 adopts the Dynamic Timing Warping (DTW) algorithm, therefore the key point of designing the recognition unit relies on two sections: Processing Element (PE) design and control method.

Figure 8:
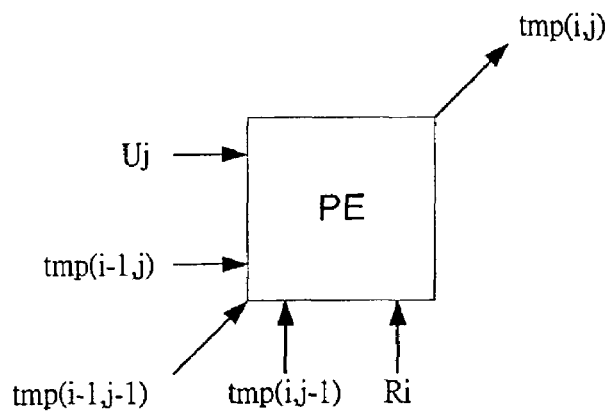
FIG. 8 is an illustrative diagram of the input/output (I/O) interface of the processing element of the present invention.
Figure 9:
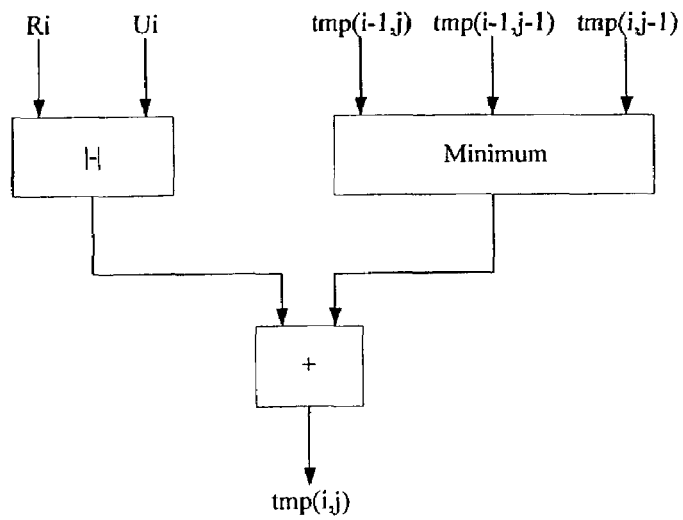
FIG. 9 is an illustrative diagram of the interior of the processing element of the present invention.

What the processing element needs to do is to select the minimum accumulation value for the distances in three directions, and calculate the distance value of this element, and add the accumulation value of the distance outputted up to this element. FIG. 8 is the illustrative diagram of the input/output (I/O) interface of the processing element. The tmp(i−1,j), tmp(i−1,j−1), tmp(i,j−1) are the distances in three directions, and the vectors of the distance value of the cepstrum parameters of Uj and Ri are the, distance values of this processing element, and select the minimum accumulation value among the distances in three directions, and add the outputted distance value of this processing element as tmp(i,j). FIG. 9 is the illustrative diagram of the interior of the processing element, and the tmp(i−1,j), tmp(i−1,j−1), tmp(i,j−1) are the distances in three directions. Through the minimum selector in the figure, the minimum is selected from the accumulation value of the distances in the three directions. Uj and Ri input the value of the vector of the cepstrum parameter into the counter, and output the distance value of this processing element and the output of the minimum selector as well as inputting into the adder. The adder will output the tmp(i,j).

Figure 10:
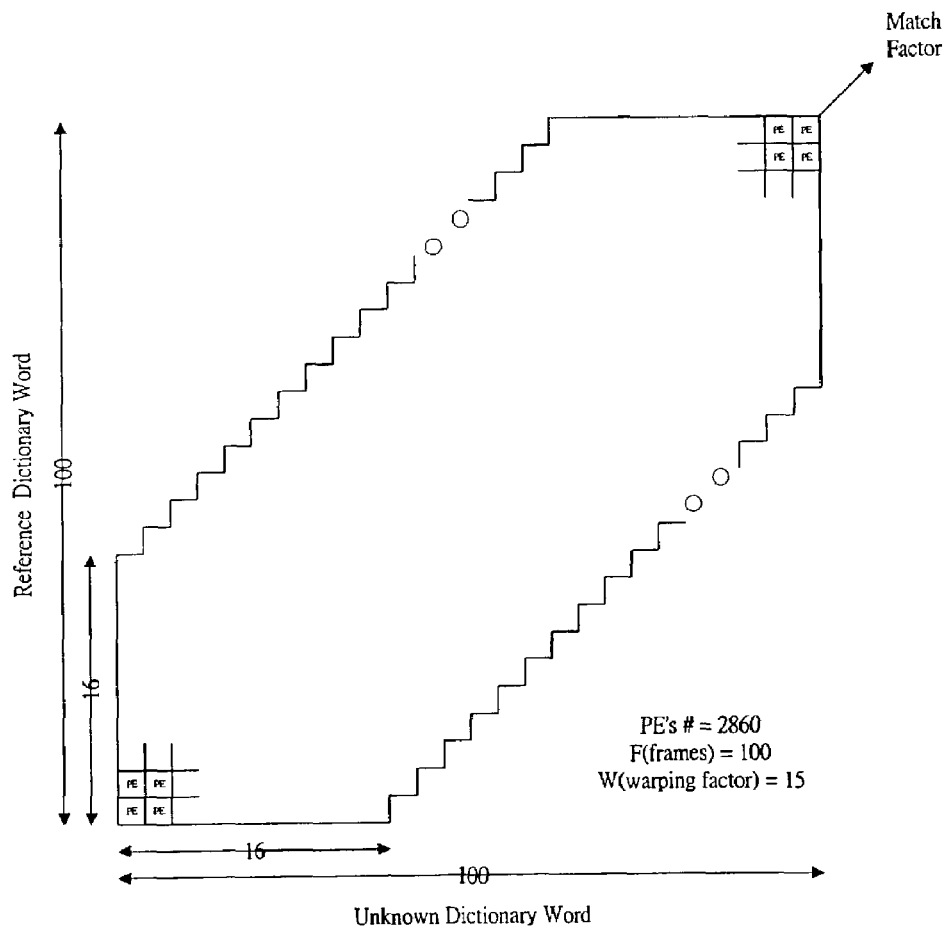
FIG. 10 is an illustrative diagram of the 100×100 lattice of the dynamic timing warping of the present invention.

Then we will introduce the actual circuit of the 100×100 dynamic timing warping. FIG. 10 is the illustrative diagram of lattice. There is a formula: if F is the number of sound frames and W is the warping factor, then the number of processing elements requiring calculation is PEs−F(2W+1)−W(W+1). Therefore in 100×100, and the warping factor is assumed as 15, it takes 2860 times of calculation for the processing elements, which is a very large number. Therefore, in the control circuit, it is appropriate to further introduce the regular control circuit. Firstly, the 2860 processing elements are cut into the front section (0~135), the middle section (136~2754) and the rear section (2755~2859) as shown in FIG. 11. If the timing at each point of the front section needs to be calculated, the timing for the accumulated value of the distances in the three directions will be listed as shown in Table 1. Table 1 shows the timing of each point that requires using the distance accumulation value in either the left, lower left, or downward directions and such accumulated value has to be obtained from which one of the shift registers. It is known from Table 1 that the front section is divided into 16 groups; the n group has n points. In these n points, the first point only needs the accumulation value of the distance in the downward direction, and uses the value in the $n-1^{th}$ shift register. The $n^{th}$ point only needs the accumulated distance value in the left direction and uses the value in the $n^{th}$ shift register. The rest accumulated distance values in the left direction uses the value in the $n^{th}$ register, and the accumulated distance value in the lower left direction uses the value in the $2(n-1)^{th}$ shift register, and the accumulated distance value in the downward direction uses the value in the $n-1^{th}$ shift register. The middle section and the rear section may also adopt similar methods to find its rules.

Figure 12:
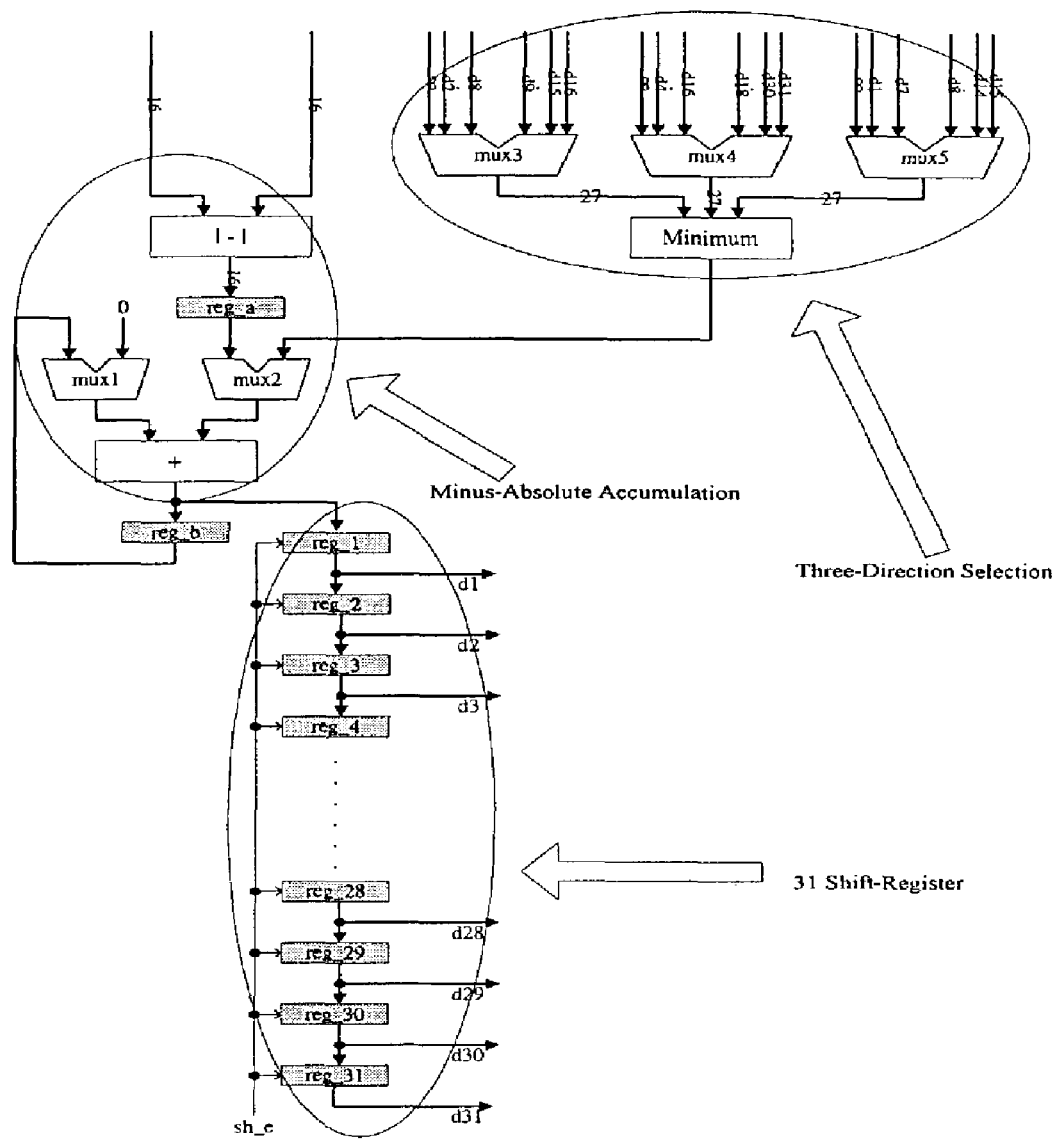
FIG. 12 is a diagram of the data path of the recognition module of the present invention.

FIG. 12 shows the data path of the DTW recognition module. On the upper left corner of the figure, there is a subtraction absolute value accumulated circuit, because it is used for the computation of absolute value of the subtraction for the scale-ten cepstrum parameter, the subtracter is used to find the distance value of this point, and the adder is used to add the accumulated distance value to the distance value of this point. At the bottom of the figure, there is a shift register using 31 shift register of the size of register to store the past accumulated distance values. The upper right corner of the figure, there is the minimum circuit among the three accumulated distance values in the left, lower left and downward directions, which uses 3 multiplexers to select the desired value from the shift registers, and through the minimum selector to select the minimum from the accumulated distance values in three directions.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A speech recognition system, designed by an Application Specific Integrated Circuit (ASIC), inputting a speech signal and outputting a recognition result, and using modular design to divide the speech recognition system into four modules, and each of the four modules forming an intellectual product (IP) on its own, wherein the four modules including: a control module, receiving an external signal for controlling an internal circuit, and said external signal comprises a training button and a recognition button; an autocorrelation and linear prediction module, comprising an autocorrelation unit and a linear predictive coefficient unit, and the two units individually finding the autocorrelation coefficient, and the linear predictive coefficient respectively, to convert the inputted speech data into linear predictive coefficient; a cepstrum module, using said linear predictive coefficient to output the cepstrum for the speech data model; a Dynamic Time Warping (DTW) module, using the DTW algorithm to analyze said speech data model and outputting a recognition result; and, wherein the control module is connected to the autocorrelation and linear predictive coefficient module unidirectionally, that is signals only flow from the control module; and the control module is connected to the cepstrum module and the DTW module bidirectionally and the autocorrelation and linear predictive coefficient module is connected to the cepstrum module unidirectionally, that is signals are transferred from the autocorrelation and linear predictive module to the cepstrum module.

2. The speech recognition as claimed in claim 1, further comprising speech receiving module which includes a set of shift register and a set of a regular register acting an interface for an external sampling frequency and an internal operating frequency to convert the speech data frequency until the operating frequency of the internal circuit being consistent, and then reading out the computation result.

3. The speech recognition as claimed in claim 1, further comprising an external memory connected to said Cepstrum module and the DTW module for storing the cepstrum of the training speech data.

4. The speech recognition as claimed in claim 3, wherein said training button saving the cepstrum of the training speech data into the external memory after receiving the training speech data and passing through the autocorrelation and linear predictive coefficient module and the cepstrum module, and after the recognition button receiving the recognition speech and passing the autocorrelation and linear predictive coefficient module and cepstrum module, the cepstrum of the recognition speech data being stored into internal registers and noticing the DTW recognition module to start accessing the cepstrum of the training speech data previously stored in the external memory and the cepstrum of the recognition speech data in the internal register and outputting a recognition score; after each record of the training speech data obtaining the recognition score, the control module taking over to select the best score and outputting the recognition result.

5. The speech recognition as claimed in claim 1, wherein said control module 10 further comprising a finite status machine (FSM) of an external sampling frequency, a finite status machine of the internal operating frequency, and a decision logic; the two finite status machines being individually controlled by the external signal for controlling the internal circuit; the finite status machine of the external sampling frequency mainly controlling the speech receiving module and noticing the autocorrelation and linear predictive coefficient module to start accessing the speech data for computation after completing the collection of the speech data; the finite status machine of the internal operating frequency mainly controlling the read and write of the external memory and the internal register and coordinating the communication between modules; when the cepstrum module completing to send out a signal, the finite status machine controlling the memory according to the different operating modes or writing the speech data into the register; said decision logic selecting the best score after each recognition score outputted from said recognition button for computation.

6. The speech recognition as claimed in claim 5, wherein said decision logic comprising a minimum selection circuit and a counter.

7. The speech recognition as claimed in claim 1, wherein said autocorrelation unit comprising at least two multipliers; a first multiplier multiplying the speech data with the Hamming window, and the value of the Hamming window being saved in a Hamming ROM; a second multiplier together with an adder to form a set of multiplication accumulated circuit for finding the autocorrelation coefficient in sequence.

8. The speech recognition as claimed in claim 1, wherein said linear predictive coefficient unit comprising 6 multiplexers and 31 registers, wherein the first to tenth registers individually storing the autocorrelation coefficients, the eleventh to twenty-ninth registers individually storing the linear predictive coefficients, the thirtieth register being used for accumulation, and the thirty-first register being used for storing an estimated error.

9. The speech recognition as claimed in claim 1, wherein said cepstrum module comprising a multiplier, an adder, a linear predictive coefficient memory (LPC RAM), a constant memory (constant ROM) and a cepstrum memory (Cep RAM) with a total of 10, and each being stored in 16 bits; the constant ROM storing 45 constants with 16 bits for each constant; the Cep RAM storing 10 cepstra and each being stored in 16 bit.

10. The speech recognition as claimed in claim 1, wherein said recognition DTW module comprising a subtraction absolute value accumulation circuit, 31 registers, 3 multiplexers, and a minimum selector.

* * * * *